United States Patent
Sorimachi et al.

(10) Patent No.: US 11,919,774 B2
(45) Date of Patent: Mar. 5, 2024

(54) COOLING ABSORPTION TOWER, CO2 RECOVERY DEVICE INCLUDING SAME, AND CO2 RECOVERY METHOD

(71) Applicant: MITSUBISHI HEAVY INDUSTRIES, LTD., Tokyo (JP)

(72) Inventors: Yoshiki Sorimachi, Yokohama (JP); Takashi Kamijo, Yokohama (JP); Shinya Kishimoto, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 185 days.

(21) Appl. No.: 17/599,762

(22) PCT Filed: Feb. 10, 2020

(86) PCT No.: PCT/JP2020/005144
§ 371 (c)(1),
(2) Date: Sep. 29, 2021

(87) PCT Pub. No.: WO2020/202804
PCT Pub. Date: Oct. 8, 2020

(65) Prior Publication Data
US 2022/0153592 A1    May 19, 2022

(30) Foreign Application Priority Data
Apr. 5, 2019    (JP) .................. 2019-072682

(51) Int. Cl.
*C01B 32/50*    (2017.01)
*B01D 53/14*    (2006.01)
(Continued)

(52) U.S. Cl.
CPC .......... *C01B 32/50* (2017.08); *B01D 53/1418* (2013.01); *B01D 53/1475* (2013.01);
(Continued)

(58) Field of Classification Search
CPC .................. B01D 53/1418; B01D 53/1475; B01D 53/18; B01D 53/62; B01D 53/78;
(Continued)

(56) References Cited

U.S. PATENT DOCUMENTS

| 4,702,898 A | 10/1987 | Grover |
| 2009/0148371 A1 | 6/2009 | Reddy et al. |

(Continued)

FOREIGN PATENT DOCUMENTS

| DE | 37 38 913 A1 | 5/1989 |
| EP | 0 399 085 A1 | 11/1990 |

(Continued)

OTHER PUBLICATIONS

Extended European Search Report for European Application No. 20782153.9, dated May 2, 2022.
(Continued)

*Primary Examiner* — Anita Nassiri-Motlagh
(74) *Attorney, Agent, or Firm* — Birch, Stewart, Kolasch & Birch, LLP

(57) ABSTRACT

A cooling absorption tower for a $CO_2$ recovery device, comprises: an outer shell; a cooling section for cooling a flue gas, the cooling section being disposed in the outer shell; and an absorbing section configured to cause $CO_2$ in the flue gas cooled by the cooling section to be absorbed in an absorption solvent, the absorbing section being disposed in the outer shell and above the cooling section.

9 Claims, 2 Drawing Sheets

(51) Int. Cl.
  *B01D 53/18* (2006.01)
  *B01D 53/62* (2006.01)
  *B01D 53/78* (2006.01)

(52) U.S. Cl.
  CPC .............. *B01D 53/18* (2013.01); *B01D 53/62* (2013.01); *B01D 53/78* (2013.01); *B01D 2252/10* (2013.01); *B01D 2252/20478* (2013.01); *B01D 2252/504* (2013.01); *B01D 2257/504* (2013.01); *B01D 2258/0283* (2013.01); *C01P 2006/80* (2013.01)

(58) Field of Classification Search
  CPC ...... B01D 2252/10; B01D 2252/20478; B01D 2252/504
  USPC ........................................................ 423/220
  See application file for complete search history.

(56) References Cited

U.S. PATENT DOCUMENTS

| | | |
|---|---|---|
| 2011/0041685 A1 | 2/2011 | Tanaka et al. |
| 2013/0340623 A1 | 12/2013 | Tsujiuchi et al. |
| 2014/0245888 A1 | 9/2014 | Tsujiuchi et al. |

FOREIGN PATENT DOCUMENTS

| | | |
|---|---|---|
| JP | 61-150033 U | 9/1986 |
| JP | 62-23420 A | 1/1987 |
| JP | 1-249127 A | 10/1989 |
| JP | 2012-217971 A | 11/2012 |
| JP | 2013-59726 A | 4/2013 |
| JP | 2014-156392 A | 8/2014 |
| WO | WO 2007/075485 A2 | 7/2007 |
| WO | WO 2012/097406 A1 | 7/2012 |

OTHER PUBLICATIONS

International Preliminary Report on Patentability and Written Opinion of the International Searching Authority for International Application No. PCT/JP2020/005144, dated Oct. 14, 2021, with English translation.

International Search Report for International Application No. PCT/JP2020/005144, dated Apr. 21, 2020.

Office Action dated May 20, 2022 issued in counterpart Canadian Application No. 3,132,951 with an English Translation.

COOLING ABSORPTION TOWER, CO2 RECOVERY DEVICE INCLUDING SAME, AND CO2 RECOVERY METHOD

TECHNICAL FIELD

The present disclosure relates to a cooling absorption tower, a $CO_2$ recovery device including the same, and a $CO_2$ recovery method.

BACKGROUND

As a method for recovering $CO_2$ in flue gas produced by combustion of fuel or the like, a method has been proposed in which the flue gas and a $CO_2$ absorption solvent are brought into gas-liquid contact to recover $CO_2$ in the flue gas.

For example, Patent Document 1 discloses a $CO_2$ recovery device including a cooling tower, an absorption tower, and a regeneration tower. In this $CO_2$ recovery device, $CO_2$-containing flue gas is first cooled in the cooling tower, and then the $CO_2$-containing gas is brought into contact with an absorption solvent in the absorption tower such that $CO_2$ is absorbed by the absorption solvent to remove $CO_2$ from the gas. The absorption solvent (rich solvent) which has absorbed $CO_2$ in the absorption tower is introduced to the regeneration tower and then heated with steam in a regeneration reboiler to separate $CO_2$ from the absorption solvent, and the separated $CO_2$ is recovered. The absorption solvent (lean solution) regenerated in the regeneration tower is returned to the absorption tower to be reused as the $CO_2$ absorption solvent.

CITATION LIST

Patent Literature

Patent Document 1: JP2013-59726A

SUMMARY

Problems to be Solved

In the $CO_2$ recovery device described in Patent Document 1, the cooling tower and the absorption tower are composed of separate outer shells (towers), and these outer shells are connected to each other by a connection duct. In this configuration, since the cooling tower and the absorption tower are installed separately, and an area is needed for the connection duct between the cooling tower and the absorption tower, the installation area is increased. In particular, the connection duct between the cooling tower and the absorption tower needs to be routed from the top of the cooling tower to the bottom of the absorption tower, which is a major factor in increasing the installation area of the $CO_2$ recovery device.

Therefore, it is desirable to reduce the installation area of the $CO_2$ recovery device.

In view of the above, an object of at least one embodiment of the present invention is to provide a cooling absorption tower, a $CO_2$ recovery device including the same, and a $CO_2$ recovery method whereby it is possible to reduce the installation area of the equipment.

Solution to the Problems (1) A cooling absorption tower for a $CO_2$ recovery device according to at least one embodiment of the present invention comprises: an outer shell; a cooling section, disposed in the outer shell, for cooling a flue gas; and an absorbing section disposed in the outer shell and above the cooling section and configured to cause $CO_2$ in the flue gas cooled by the cooling section to be absorbed in an absorption solvent.

With the above configuration (1), since the cooling section and the absorbing section disposed above the cooling section are installed in one outer shell, the flue gas can be treated by the cooling section and then be raised and treated by the absorbing section in one outer shell. In other words, with the above configuration (1), the functions of both the cooling tower and the absorption tower can be contained in one outer shell. Thus, compared to the case where the cooling tower and the absorption tower are installed separately, the installation space for outer shells (towers) and a connection duct connecting the outer shells can be reduced, so that the installation area of the equipment can be reduced. In addition, since the necessity of the connection duct and its support member is eliminated, costs such as material and production costs can be reduced.

(2) In some embodiments, in the above configuration (1), the absorbing section includes a chimney tray, disposed at a lowest portion of the absorbing section, for storing the absorption solvent which has absorbed $CO_2$ in the flue gas.

With the above configuration (2), since the chimney tray for holding the absorption solvent used in the absorbing section is disposed at the lowest portion of the absorbing section, the absorption solvent is prevented from dropping into the cooling section disposed below the absorbing section. Thus, while appropriately preventing mixing of the absorption solvent into cooling water used in the cooling section, the functions of both the cooling tower and the absorption tower can be contained in one outer shell, as described in the above (1).

(3) In some embodiments, in the above configuration (1) or (2), an inner diameter of the outer shell at the cooling section is larger than an inner diameter of the outer shell at the absorbing section.

With the above configuration (3), since the inner diameter of the outer shell at the absorbing section is set to be smaller than the inner diameter of the outer shell at the cooling section, the material cost for manufacturing the cooling absorption tower can be reduced compared to the case where the inner diameter at the absorbing section is the same as the inner diameter at the cooling section. Since the flue gas is supplied to the absorbing section after it has been cooled by the cooling section, by taking into consideration the reduction in volume of the flue gas due to the temperature drop caused by cooling, the inner diameter at the absorbing section can be made smaller than the inner diameter at the cooling section.

(4) A $CO_2$ recovery device according to at least one embodiment of the present invention comprises: the cooling absorption tower described in any one of the above (1) to (3).

With the above configuration (4), since the cooling section and the absorbing section disposed above the cooling section are installed in one outer shell, the flue gas can be treated by the cooling section and then be raised and treated by the absorbing section in one outer shell. In other words, with the above configuration (1), the functions of both the cooling tower and the absorption tower can be contained in one outer shell. Thus, compared to the case where the cooling tower and the absorption tower are installed separately, the installation space for outer shells (towers) and a connection duct connecting the outer shells can be reduced, so that the installation area of the equipment can be reduced.

In addition, since the necessity of the connection duct and its support member is eliminated, costs such as material and production costs can be reduced.

(5) In some embodiments, in the above configuration (4), the absorbing section includes a chimney tray, disposed at a lowest portion of the absorbing section, for holding the absorption solvent which has absorbed $CO_2$ in the flue gas. The $CO_2$ recovery device further comprises: an absorption solvent tank disposed below the absorbing section; and a tank introduction line for introducing the absorption solvent stored in the chimney tray to the absorption solvent tank.

With the above configuration (5), since the absorbing section is disposed above the absorption solvent tank, the absorption solvent stored in the chimney tray of the absorbing section can be moved to the absorption solvent tank via the tank introduction line by using the difference in height between the chimney tray and the absorption solvent tank.

(6) In some embodiments, in the above configuration (5), the tank introduction line extends to the absorption solvent tank without passing through underground.

Generally, an absorption tower is installed on the ground surface. In this case, in order to move an absorption solvent in the absorption tower to a storage tank by the height difference, the storage tank needs to be installed underground and the absorption solvent in the absorption tower needs to be introduced to the storage tank via a line through the underground. In this regard, with the $CO_2$ recovery device described in the above (5), since the absorbing section is disposed in the outer shell and above the cooling section, which is usually installed on the ground surface, the absorption solvent from the absorbing section can be introduced to the absorption solvent tank through the tank introduction line, which does not go through the underground, as described in the above (6). In other words, since the absorption solvent from the absorbing section can be introduced to the absorption solvent tank without going through underground piping or tanks, it is possible to reduce the time required to extract the absorption solvent from the absorbing section during maintenance, etc.

(7) In some embodiments, in the above configuration (5) or (6), the tank introduction line includes an overflow line connected to the chimney tray within a height range of an upper half of a riser of the chimney tray.

With the above configuration (7), since the overflow line is connected to the chimney tray within a height range of the upper half of the riser of the chimney tray, when the liquid level of the absorption solvent in the chimney tray rises rapidly, the absorption solvent can be introduced to the absorption solvent tank via the overflow line. Thus, it is possible to more reliably prevent the absorption solvent in the absorbing section from dropping into the cooling section and mixing into cooling water.

(8) In some embodiments, in the above configuration (7), the $CO_2$ recovery device comprises a valve disposed in the overflow line; and a blower for feeding a flue gas to the cooling absorption tower. The valve is configured to be opened based on a signal indicating that the blower is stopped.

During the normal operation of the $CO_2$ recovery device, the pressure of the flue gas in the cooling absorption tower retains the absorption solvent in the packing material of the absorbing section. However, when the blower used to feed the flue gas to the cooling absorption tower is stopped, the flue gas pressure in the cooling absorption tower decreases, which reduces the retention of the absorption solvent by the flue gas pressure, causing the absorption solvent to drop from the packing material and the liquid level in the chimney tray to rise rapidly. In this regard, with the above configuration (8), since the valve disposed in the overflow line is configured to be opened based on a signal indicating that the blower is stopped, when the liquid level of the absorption solvent in the chimney tray rises rapidly due to the stop of the blower, the absorption solvent can be introduced to the absorption solvent tank via the overflow line. Thus, it is possible to more reliably prevent the absorption solvent in the absorbing section from dropping into the cooling section and mixing into cooling water.

(9) In some embodiments, in any one of the above configurations (5) to (8), the $CO_2$ recovery device comprises: a regeneration tower for regenerating the absorption solvent from the absorbing section; a regeneration tower introduction line for extracting the absorption solvent from the chimney tray and introducing the absorption solvent to the regeneration tower; and a branch line branching from the regeneration tower introduction line and connected to the absorption solvent tank. The tank introduction line includes the branch line and a portion of the regeneration tower introduction line upstream of a branch position of the branch line.

During the normal operation of the $CO_2$ recovery device, the absorption solvent stored in the chimney tray is introduced to the regeneration tower via the regeneration tower introduction line. With the above configuration (9), during maintenance, etc., the absorption solvent can be introduced to the absorption solvent tank via a portion of the regeneration tower introduction line (a portion upstream of the branch position) by using the difference in height between the chimney tray and the absorption solvent tank. Thus, it is possible to reduce the time required to extract the absorption solvent from the absorbing section during maintenance, etc.

(10) In some embodiments, in the above configuration (9), the $CO_2$ recovery device further comprises an absorption solvent pump, disposed in a portion of the regeneration tower introduction line downstream of the branch position, for pumping the absorption solvent to the regeneration tower.

With the above configuration (10), the absorption solvent stored in the chimney tray can be pumped to the regeneration tower by the absorption solvent pump disposed in a portion of the regeneration tower introduction line downstream of the branch position. Further, since the absorption solvent pump is usually disposed near the ground surface below the absorbing section, the suction pressure of the absorption solvent pump increases due to the height difference between the chimney tray and the absorption solvent pump, and the required head is reduced. As a result, the installation space for the absorption solvent pump and a motor for driving the pump can be reduced, and the installation area of the equipment can be reduced.

(11) A $CO_2$ recovery method according to at least one embodiment of the present invention comprises: a step of cooling a flue gas by a cooling section disposed in an outer shell; a step of feeding the flue gas cooled by the cooling section to an absorbing section disposed in the outer shell and above the cooling section; and a step of causing $CO_2$ in the flue gas to be absorbed in an absorption solvent by the absorbing section.

According to the above method (11), the cooling section and the absorbing section disposed above the cooling section are installed in one outer shell, and the flue gas is treated by the cooling section and then is raised and treated by the absorbing section in one outer shell. Thus, with the above method (11), the cooling of the flue gas and the contact between the flue gas and the absorption solvent can be performed in one outer shell. As a result, compared to the case where these processes are performed by a cooling tower and an absorption tower installed separately, the installation space for outer shells (towers) and a connection duct connecting the outer shells can be reduced, so that the installation area of the equipment can be reduced. In addition, since the necessity of the connection duct and its support member is eliminated, costs such as material and production costs can be reduced.

(12) In some embodiments, the above method (11) comprises: a step of storing the absorption solvent which has absorbed $CO_2$ in the flue gas by the absorbing section in a chimney tray disposed at a lowest portion of the absorbing section; and a step of introducing the absorption solvent stored in the chimney tray to an absorption solvent tank disposed below the absorbing section via a tank introduction line.

With the above method (12), since the absorption solvent tank is disposed below the absorbing section, the absorption solvent stored in the chimney tray of the absorbing section can be moved to the absorption solvent tank via the tank introduction line by using the difference in height between the chimney tray and the absorption solvent tank.

(13) In some embodiments, in the above method (12), the $CO_2$ recovery method comprises a step of feeding a flue gas to the cooling section by using a blower. The cooling step includes cooling the flue gas fed by the blower. The step of introducing to the absorption solvent tank includes, when the blower is stopped, opening a valve disposed in the tank introduction line to introduce the absorption solvent to the absorption solvent tank.

During the normal operation of the $CO_2$ recovery device, the pressure of the flue gas in the cooling absorption tower retains the absorption solvent in the packing material of the absorbing section. However, when the blower used to feed the flue gas to the cooling absorption tower is stopped, the flue gas pressure in the cooling absorption tower decreases, which reduces the retention of the absorption solvent by the flue gas pressure, causing the absorption solvent to drop from the packing material and the liquid level in the chimney tray to rise rapidly. In this regard, with the above method (13), since the valve disposed in the overflow line opens when the blower is stopped, when the liquid level of the absorption solvent in the chimney tray rises rapidly due to the stop of the blower, the absorption solvent can be introduced to the absorption solvent tank via the overflow line. Thus, it is possible to more reliably prevent the absorption solvent in the absorbing section from dropping into the cooling section and mixing into cooling water.

Advantageous Effects

At least one embodiment of the present invention provides a cooling absorption tower, a $CO_2$ recovery device including the same, and a $CO_2$ recovery method whereby it is possible to reduce the installation area of the equipment.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

Figure 1:
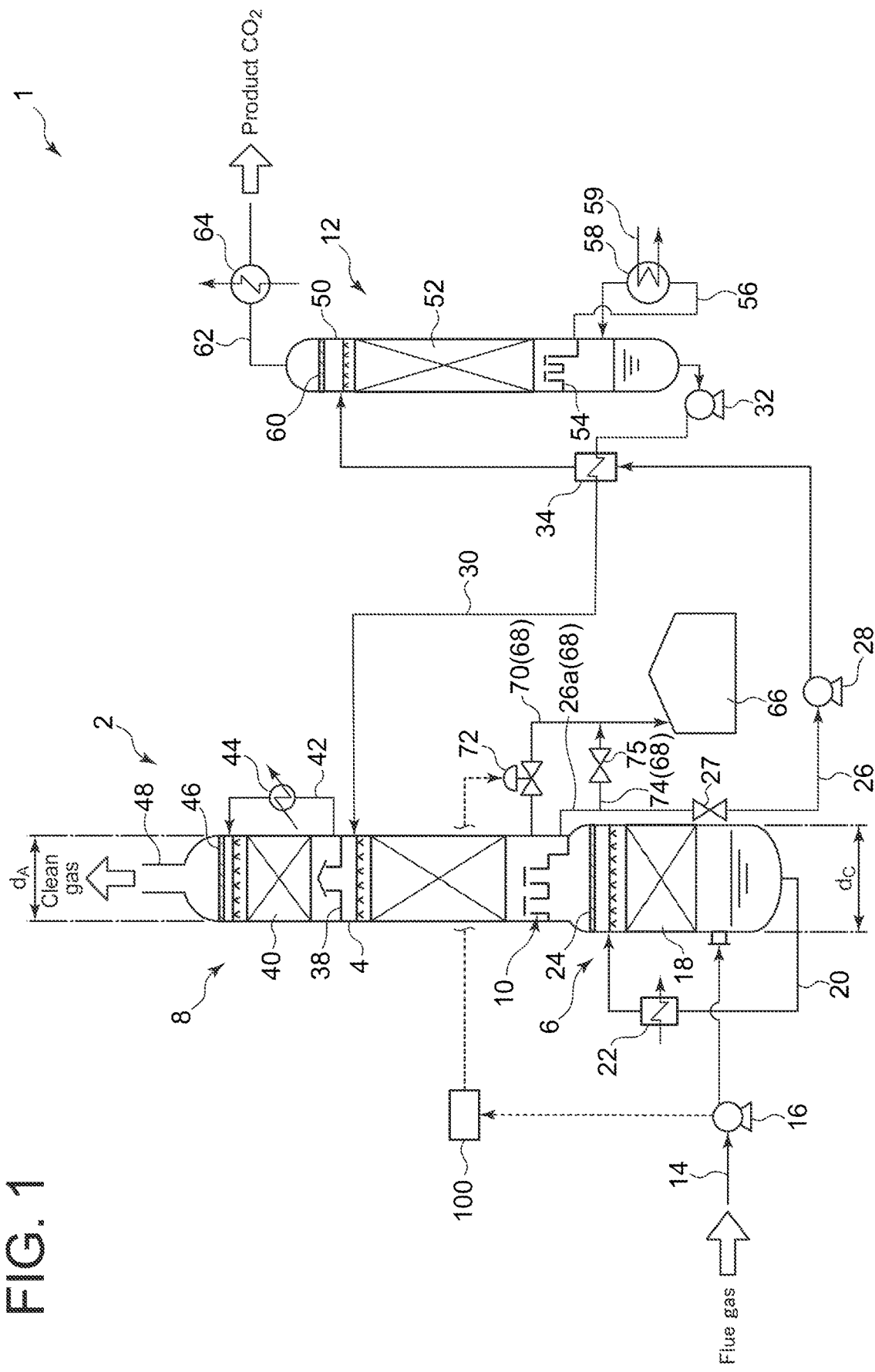
FIG. 1 is a schematic diagram of a $CO_2$ recovery device including a cooling absorption tower according to an embodiment.
Figure 2:
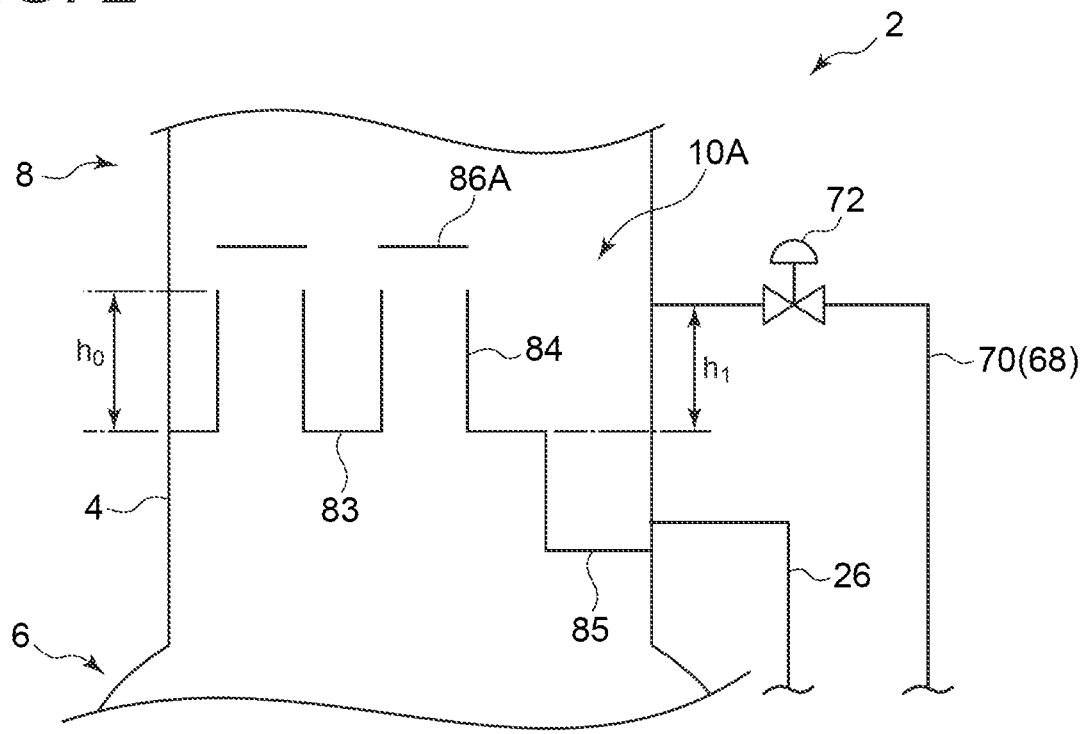
FIG. 2 is a schematic diagram of the lowest portion of the absorbing section of the cooling absorption tower according to an embodiment.

FIG. 1 is a schematic diagram of a $CO_2$ recovery device including a cooling absorption tower according to an embodiment of the present invention. The $CO_2$ recovery device shown in FIGS. 1 and 2 is a device for recovering $CO_2$ from flue gas discharged from a power generation facility, a plant, or the like. As illustrated in the drawing, the $CO_2$ recovery device 1 includes a cooling absorption tower 2 for causing $CO_2$ in the flue gas to be absorbed in an absorption solvent, and a regeneration tower 12 for regenerating the absorption solvent which has absorbed $CO_2$ in the cooling absorption tower 2.

The cooling absorption tower 2 includes an outer shell 4, and a cooling section 6 and an absorbing section 8 disposed in the outer shell 4. The cooling section 6 is configured to cool the supplied $CO_2$-containing flue gas. The absorbing section 8 is disposed above the cooling section 6 and is configured to cause $CO_2$ in the flue gas cooled by the cooling section 6 to be absorbed in an absorption solvent. At the lowest portion of the absorbing section 8, a chimney tray 10 for holding the absorption solvent is disposed.

Flue gas from a plant or the like is introduced to the cooling section 6 of the cooling absorption tower 2 via a flue gas introduction line 14. The flue gas introduction line 14 is provided with a blower 16. The blower 16 is configured to feed the flue gas to the cooling absorption tower 2.

The cooling section 6 includes a gas-liquid contact part 18, a circulation line 20 for circulating cooling water, a cooler 22 disposed in the circulation line 20, and a demister 24 disposed above the gas-liquid contact part 18. The gas-liquid contact part 18 may have a packing material.

The gas-liquid contact part 18 is supplied with cooling water from the circulation line 20 from above, and the flue gas is cooled in the gas-liquid contact part 18 by contact between the cooling water and the flue gas from the flue gas introduction line 14. The cooling water dropped from the gas-liquid contact part 18 is stored in a bottom portion of the cooling absorption tower 2, and is supplied again to the gas-liquid contact part 18 via the circulation line 20. The cooling water is cooled by the cooler 22 disposed in the circulation line 20 before it is supplied to the gas-liquid contact part 18. The flue gas having passed through the gas-liquid contact part 18 goes through the demister 24 to remove droplets accompanying the flue gas, further rises, and flows into the absorbing section 8 through the chimney tray 10.

The absorbing section 8 includes a gas-liquid contact part 36 for absorbing $CO_2$ gas in the flue gas, a washing section 40 for washing the flue gas from which the $CO_2$ gas has been removed, and a demister 46, disposed above the washing section 40, for removing mist in the flue gas.

The gas-liquid contact part 36 is supplied with the absorption solvent (lean solvent) stored in the bottom portion of the regeneration tower 12 via a lean solvent line 30. The lean solvent line 30 is provided with a lean solvent pump 32 for pumping the lean solvent. Inside the cooling absorption tower 2, the flue gas supplied from the cooling section 6 to the absorbing section 8 through the chimney tray 10 flows upward in the cooling absorption tower 2 (in the outer shell 4) and comes into countercurrent contact in the gas-liquid contact part 36 with the absorption solvent (lean solvent) supplied from above the gas-liquid contact part 36. As a result, $CO_2$ in the flue gas is absorbed by the absorption solvent, and $CO_2$ is separated and removed from the flue gas. The gas-liquid contact part 36 may be formed by a packed layer packed with a packing material made of any material.

The absorption solvent is a liquid containing a $CO_2$ absorption agent. Although the type of $CO_2$ absorption agent is not limited, amines such as alkanolamines represented by monoethanolamine and diethanolamine, and various alkaline solutions other than amines such as sodium hydroxide, potassium hydroxide, and calcium hydroxide can be used as the $CO_2$ absorption agent.

The absorption solvent which has absorbed $CO_2$ from the flue gas in the gas-liquid contact part 36 descends from the gas-liquid contact part 36 and is stored in the chimney tray 10. The absorption solvent stored in the chimney tray 10 is a rich solvent having a higher $CO_2$ concentration than the absorption solvent (lean solvent) stored in the bottom portion of the regeneration tower 12.

The washing section 40 is configured to wash the flue gas in order to recover the $CO_2$ absorption agent contained in the flue gas after removal of $CO_2$. The washing section 40 is supplied with cleaning water from a circulation line 42 from above. When the flue gas after removal of $CO_2$ comes into contact with the cleaning water in the washing section 40, the $CO_2$ recovery agent contained in the flue gas is dissolved in the cleaning water and thus can be recovered. Below the washing section 40, a chimney tray 38 is disposed. The cleaning water which has descended from the washing section 40 and is stored in the chimney tray 38 is circulated through the circulation line 42 by a circulation pump (not shown) and is again supplied to the washing section 40 from above. The circulation line 42 is provided with a cooler 44 for cooling the cleaning water.

The flue gas from which the $CO_2$ absorption agent has been removed passes through the demister 46 disposed above the washing section 40, where the mist in the flue gas is captured. The flue gas (clean gas) from which mist has been removed is discharged to the outside through a top portion 48 of the cooling absorption tower 2.

The absorption solvent (rich solvent) stored in the chimney tray 10 at the lowest portion of the absorbing section 8 is supplied from the cooling absorption tower 2 to the regeneration tower 12 via a rich solvent line 26 (regeneration tower introduction line). The rich solvent line 26 is provided with a rich solvent pump 28 for pumping the rich solvent to the regeneration tower 12. Further, a heat exchanger 34 is disposed in the rich solvent line 26 to exchange heat between the rich solvent flowing in the rich solvent line 26 and the absorption solvent (lean solvent) flowing in the lean solvent line 30. By heating the rich solvent through heat exchange with the lean solvent of relatively high temperature in the heat exchanger 34, it is possible to promote the regeneration of the absorption solvent in the regeneration tower 12 described below.

The regeneration tower 12 includes an outer shell 50, a release part 52 for releasing $CO_2$ gas from the rich solvent, and a chimney tray 54 disposed below the release part 52. The release part 52 has a packing material and is supplied with the absorption solvent (rich solvent) from the rich solvent line 26 from above. In the release part 52, the rich solvent supplied from the rich solvent line 26 is heated by saturated steam supplied from a regeneration reboiler 58 to release the $CO_2$ gas, so that the absorption solvent (lean solvent) with relatively low $CO_2$ content is obtained. The lean solvent that drops from the release part 52 is received by the chimney tray 54.

The $CO_2$ gas released from the rich solvent in the release part 52 rises upward in the regeneration tower 12 toward the top of the release part 52, and after mist in the gas is captured by a demister 60, the gas is discharged from the regeneration tower 12 through a recovery line 62 connected to the top of the regeneration tower 12. The recovery line 62 is provided with a condenser 64. The condenser 64 is configured to cool the $CO_2$ gas discharged from the regeneration tower 12 by heat exchange with cooling water to condense moisture contained in the $CO_2$ gas. The $CO_2$ gas thus separated from moisture is recovered as a product. A gas-liquid separator (not shown) may be disposed downstream of the condenser 64 in the recovery line 62 to separate the $CO_2$ gas from the condensate.

The regeneration tower 12 is connected to a re-boiler line 56 provided with a regeneration reboiler 58. The re-boiler line 56 is configured to extract the absorption solvent stored in the regeneration tower 12 and return it to the regeneration tower 12 via the regeneration reboiler 58. The regeneration reboiler 58 is configured to heat the absorption solvent (lean solvent) introduced through the re-boiler line 56, by heat exchange with a heating medium. The regeneration reboiler 58 is supplied with steam as the heating medium via a steam line 59.

The lean solvent heated by the regeneration reboiler 58 at least partially changes its phase to saturated vapor and is discharged from the regeneration reboiler 58 in a gas-liquid multiphase state. The absorption solvent (lean solvent) discharged from the regeneration reboiler 58 is supplied to the bottom portion (below the chimney tray 54) of the regeneration tower 12 via the re-boiler line 56.

The saturated steam supplied from the re-boiler line 56 to the bottom portion of the regeneration tower 12 raises in the regeneration tower 12 through the chimney tray 54, and is used to heat the rich solvent in the release part 52 to release $CO_2$ contained in the rich solvent, as described above.

On the other hand, the lean solvent supplied to the bottom portion of the regeneration tower 12 via the re-boiler line 56 (i.e., lean solvent that does not change phase in the regeneration reboiler 58) is stored in the bottom portion of the regeneration tower 12. This lean solvent is extracted from the bottom portion of the regeneration tower 12 via the lean solvent line 30 and is supplied to the absorbing section 8 of the cooling absorption tower 2 by the lean solvent pump 32 disposed in the lean solvent line 30. The lean solvent thus returned to the cooling absorption tower 2 is reused as the absorption solvent for absorbing $CO_2$ contained in the flue gas in the absorbing section 8. The lean solvent flowing in the lean solvent line 30 is cooled at the heat exchanger 34 by heat exchange with the rich solvent flowing in the rich solvent line 26.

As described above, the cooling absorption tower 2 according to the present embodiment includes the outer shell 4, and the cooling section 6 and the absorbing section 8 disposed in the outer shell 4, and the absorbing section 8 is disposed in the outer shell 4 and above the cooling section 6. In other words, in plan view, the cooling section 6 and the absorbing section 8 at least partially overlap. Otherwise, the center line of the outer shell 4, the center line of the cooling section 6, and the center line of the absorbing section 8 substantially coincide with each other.

Thus, with the cooling absorption tower 2 described above, in one outer shell 4, the flue gas is cooled by the cooling section 6 and is then raised in the outer shell 4 and treated by the absorbing section 8. Thus, since the functions of both conventional cooling tower and absorption tower can be contained in one outer shell, compared to the case where the cooling tower and the absorption tower are installed separately, the installation space for outer shells (towers) and a connection duct connecting the outer shells can be reduced, so that the installation area of the $CO_2$ recovery device 1 can be reduced. In addition, since the necessity of the connection duct and its support member is eliminated, costs such as material and production costs can be reduced.

In some embodiments, the inner diameter dc (see FIG. 1) of the outer shell 4 at the cooling section 6 is larger than the inner diameter $d_A$ (see FIG. 1) of the outer shell 4 at the absorbing section 8.

When the inner diameter $d_A$ of the outer shell 4 at the absorbing section 8 is set to be smaller than the inner diameter dc of the outer shell 4 at the cooling section 6, the material cost for manufacturing the cooling absorption tower 2 can be reduced compared to the case where the inner diameter $d_A$ at the absorbing section 8 is the same as the inner diameter dc at the cooling section 6. Since the flue gas is supplied to the absorbing section 8 after it has been cooled by the cooling section 6, by taking into consideration the reduction in volume of the flue gas due to the temperature drop caused by cooling, the inner diameter $d_A$ at the absorbing section 8 can be made smaller than the inner diameter dc at the cooling section 6.

The inner diameter dc of the outer shell 4 at the cooling section 6 may be adjusted according to the flue gas condition (e.g., temperature) supplied from the flue gas introduction line 14 to the cooling absorption tower 2. The inner diameter $d_A$ of the outer shell 4 at the absorbing section 8 may be adjusted according to the temperature of the flue gas which has been cooled by the cooling section 6.

In the above-described embodiment, the absorbing section 8 includes a chimney tray 10, disposed at the lowest portion of the absorbing section 8, for storing the absorption solvent which has absorbed $CO_2$ in the flue gas.

When the chimney tray 10 for holding the absorption solvent used in the absorbing section 8 is disposed at the lowest portion of the absorbing section 8, the absorption solvent is prevented from dropping into the cooling section 6 disposed below the absorbing section 8. Thus, while appropriately preventing mixing of the absorption solvent into cooling water used in the cooling section 6, the functions of both conventional cooling tower and the absorption tower can be contained in one outer shell.

Figure 3:
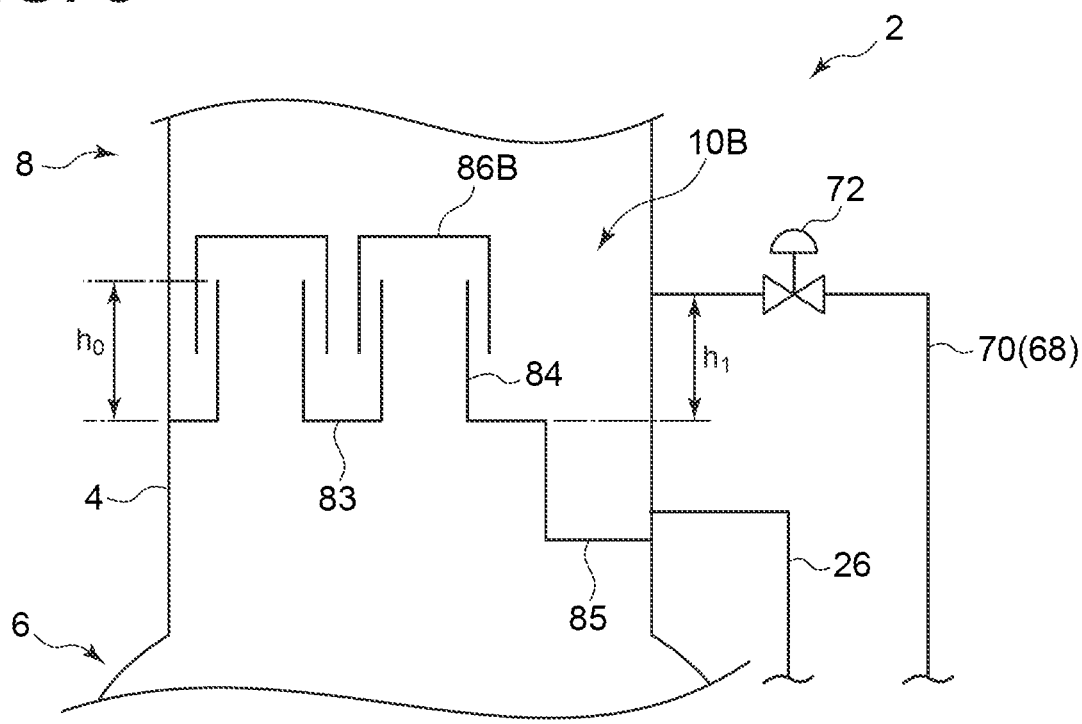
FIG. 3 is a schematic diagram of the lowest portion of the absorbing section of the cooling absorption tower according to an embodiment.

FIGS. 2 and 3 are each a schematic diagram of the lowest portion of the absorbing section 8 of the cooling absorption tower 2 according to an embodiment. In the exemplary embodiments shown in FIGS. 2 and 3, the absorbing section 8 includes a chimney tray 10A, 10B (collectively referred to as chimney tray 10).

The chimney tray 10 (10A, 10B) includes a bottom portion 83 disposed along a plane perpendicular to the center line of the outer shell 4, a step portion recessed from the bottom portion 83, a riser 84 extending upward from the bottom portion 83, and a cover 86 (86A, 86B) disposed above the riser 84. The interior space of the absorbing section 8 communicates with the interior space of the cooling section 6 via the riser 84.

In the exemplary embodiment shown in FIG. 2, the cover 86A disposed above the riser 84 is a lid-type cover that covers the top of the riser 84.

In the exemplary embodiment shown in FIG. 3, the cover 86B disposed above the riser 84 is a cap-type cover that covers the top and sides of the riser 84. The cap-type cover 86B is disposed so as to partially overlap the riser 84 in the height direction of the riser 84. In this case, the cap-type cover 86 can more effectively prevent the absorption solvent stored in the chimney tray 10B from entering the riser 84. Consequently, it is possible to more effectively prevent mixing of the absorption solvent into cooling water used in the cooling section 6.

Referring to FIG. 1 again, the $CO_2$ recovery device 1 according to some embodiments will be described in more detail.

As shown in FIG. 1, the $CO_2$ recovery device 1 further includes an absorption solvent tank 66 disposed below the absorbing section 8, and a tank introduction line 68 for introducing the absorption solvent stored in the chimney tray 10 disposed at the lowest portion of the absorbing section 8 to the absorption solvent tank 66. The absorption solvent tank 66 is used, for example, to temporarily store the absorption solvent during maintenance or emergency shutdown of the $CO_2$ recovery device 1.

Thus, since the absorption solvent tank 66 is disposed below the absorbing section 8, the absorption solvent stored in the chimney tray 10 of the absorbing section 8 can be moved to the absorption solvent tank 66 via the tank introduction line 68 by using the difference in height between the chimney tray 10 and the absorption solvent tank 66.

In some embodiments, for example as shown in FIG. 1, the tank introduction line 68 includes an overflow line 70 connected to the chimney tray 10 within a height range of the upper half of the riser 84 (see FIGS. 2 and 3) of the chimney tray 10. In other words, when $h_0$ is the length of the riser 84 (height from the bottom portion 83) and, $h_1$ is the height of the connection position of the overflow line 70 to the cooling absorption tower 2 from the bottom portion 83 of the chimney tray 10, $h_1 \geq h_0/2$ is satisfied.

During the normal operation of the $CO_2$ recovery device 1, the pressure of the flue gas in the cooling absorption tower 2 retains the absorption solvent in the packing material of the gas-liquid contact part 36 of the absorbing section 8. However, when the blower 16 used to feed the flue gas to the cooling absorption tower 2 is stopped, the flue gas pressure in the cooling absorption tower 2 decreases, which reduces the retention of the absorption solvent by the flue gas pressure, causing the absorption solvent to drop from the packing material and the liquid level in the chimney tray 10 to rise rapidly. In this regard, in the above-described embodiment, since the overflow line 70 is connected to the chimney tray 10 within a height range of the upper half of the riser 84 of the chimney tray 10, when the liquid level of the absorption solvent in the chimney tray 10 rises rapidly, the absorption solvent can be introduced to the absorption solvent tank 66 via the overflow line 70. Thus, it is possible to more reliably prevent the absorption solvent in the absorbing section 8 from dropping into the cooling section 6 and mixing into cooling water.

In some embodiments, the overflow line 70 may be provided with a shutoff valve 72 (valve). The shutoff valve 72 may be configured to be opened based on a signal indicating that the blower 16 is stopped.

As shown in FIG. 1, the $CO_2$ recovery device 1 may include a controller 100 for controlling the opening and closing of the shutoff valve 72. The controller 100 may be configured to receive a signal indicating the operating status of the blower 16 and to open the shutoff valve 72 upon receipt of a signal indicating that the blower 16 is stopped.

In the above-described embodiment, since the shutoff valve 72 (valve) disposed in the overflow line 70 is configured to be opened based on a signal indicating that the blower 16 is stopped, when the liquid level of the absorption solvent in the chimney tray 10 rises rapidly due to the stop of the blower 16, the absorption solvent can be introduced to the absorption solvent tank 66 via the overflow line 70. Thus, it is possible to more reliably prevent the absorption solvent in the absorbing section 8 from dropping into the cooling section 6 and mixing into cooling water.

The shutoff valve 72 may be closed when the blower 16 is running (i.e., during normal operation of the $CO_2$ recovery device). Further, the liquid level in the chimney tray 10 may be controlled based on a detection result of a liquid level sensor for detecting the liquid level in the chimney tray 10.

In some embodiments, for example as shown in FIG. 1, the tank introduction line 68 includes a branch line 74 branching from the rich solvent line 26 (regeneration tower introduction line) and connected to the absorption solvent tank 66, and an upstream portion 26a of the rich solvent line 26 upstream of the branch position of the branch line 74.

As shown in FIG. 1, the branch line 74 may be provided with a valve 75 for switching the communication status between the storage portion for the absorption solvent of the chimney tray 10 and the absorption solvent tank 66. Further, the rich solvent line 26 may be provided with a valve 27 for adjusting the flow rate of the rich solvent (absorption solvent) flowing in the rich solvent line 26. By operating these valves 75, 27 appropriately, the destination (absorption solvent tank 66 or regeneration tower 12) of the absorption solvent stored in the chimney tray 10 can be selected appropriately.

In the above-described embodiment, during normal operation of the $CO_2$ recovery device 1, the absorption solvent stored in the chimney tray 10 is introduced to the regeneration tower 12 via the rich solvent line 26 (regeneration tower introduction line), whereas during maintenance, etc., the absorption solvent is introduced to the absorption solvent tank 66 via the upstream portion 26a of the rich solvent line 26 (regeneration tower introduction line) by using the difference in height between the chimney tray 10 and the absorption solvent tank 66. Thus, it is possible to reduce the time required to extract the absorption solvent from the absorbing section 8 during maintenance, etc.

In some embodiments, the tank introduction line 68 extends from the chimney tray 10 to the absorption solvent tank 66 without passing through the underground.

Generally, an absorption tower is installed on the ground surface. In this case, in order to move an absorption solvent in the absorption tower to a storage tank by the height difference, the storage tank needs to be installed underground and the absorption solvent in the absorption tower needs to be introduced to the storage tank via a line through the underground. In this regard, the absorption solvent from the chimney tray 10 (absorbing section 8) can be introduced to the absorption solvent tank 66 disposed below the absorbing section 8 through the tank introduction line 68, which does not go through the underground. In other words, since the absorption solvent from the absorbing section 8 can be introduced to the absorption solvent tank 66 without going through underground piping or tanks, it is possible to reduce the time required to extract the absorption solvent from the absorbing section 8 during maintenance, etc.

In some embodiments, as shown in FIG. 1, a rich solvent pump 28 (absorption solvent pump) for pumping the absorption solvent to the regeneration tower 12 is disposed in a portion of the rich solvent line 26 (regeneration tower introduction line) downstream of the branch line 74. The rich solvent pump 28 may be disposed below the absorbing section 8.

In this case, the suction pressure of the rich solvent pump 28 (absorption solvent pump) increases due to the height difference between the chimney tray 10 and the rich solvent pump 28, and the required head of the rich solvent pump 28 is reduced. As a result, the installation space for the rich solvent pump 28 and a motor for driving the pump can be reduced, and the installation area of the $CO_2$ recovery device 1 can be reduced.

Next, the $CO_2$ recovery method (operation method of $CO_2$ recovery device) according to some embodiments will be described.

The method for recovering $CO_2$ from the flue gas using the $CO_2$ recovery device 1 has already been described above in detail. The $CO_2$ recovery method according to an embodiment includes a step of cooling the flue gas by the cooling section 6 disposed in the outer shell 4 of the cooling absorption tower 2, a step of feeding the flue gas cooled by the cooling section 6 to the absorbing section 8 disposed in the outer shell 4 and above the cooling section 6, and a step of causing $CO_2$ in the flue gas to be absorbed in the absorption solvent by the absorbing section 8.

During the normal operation of the $CO_2$ recovery device 1, the absorption solvent stored in the chimney tray 10 of the absorbing section 8 is introduced to the regeneration tower 12 via the rich solvent line 26 (regeneration tower introduction line). To this end, the valves (shutoff valve 72 and valve 75) disposed in the tank introduction line 68 are closed, and the valve 27 disposed in the rich solvent line 26 is opened.

On the other hand, during maintenance of the $CO_2$ recovery device 1, in order to move the absorption solvent stored in the chimney tray 10 of the absorbing section 8 to the absorption solvent tank 66, the valve 27 disposed in the rich solvent line 26 is closed, and the valve 75 disposed in the branch line 74 (tank introduction line 68) is opened. As a result, the absorption solvent stored in the chimney tray 10 of the absorbing section 8 is introduced to the absorption solvent tank 66 via the branch line 74.

At this time, the shutoff valve 72 in the overflow line 70 (tank introduction line 68) may be opened. With this configuration, even when the liquid level in the chimney tray 10 rises rapidly, the absorption solvent can be led to the absorption solvent tank 66 via the overflow line 70, so that the absorption solvent is more reliably prevented from entering the cooling section 6 through the chimney tray 10. In addition, since the absorption solvent in the chimney tray 10 can be moved to the absorption solvent tank 66 via the branch line 74 and the overflow line 70, the transfer of the absorption solvent can be completed more quickly.

Next, in the event of emergency shutdown of the $CO_2$ recovery device 1, for example, when the blower 16 of the flue gas introduction line 14 is stopped, the controller 100 receives a signal indicating that the blower 16 is stopped. The controller 100 opens the shutoff valve 72 disposed in the overflow line 70 (tank introduction line 68) based on this signal.

As a result, even when the liquid level of the absorption solvent in the chimney tray 10 rises rapidly due to the stop of the blower 16, the absorption solvent can be introduced to the absorption solvent tank 66 via the overflow line 70. Thus, it is possible to more reliably prevent the absorption solvent in the absorbing section 8 from dropping into the cooling section 6 and mixing into cooling water.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

REFERENCE SIGNS LIST

2 Cooling absorption tower
4 Outer shell
6 Cooling section
8 Absorbing section
10, 10A, 10B Chimney tray
12 Regeneration tower
14 Flue gas introduction line
16 Blower
18 Gas-liquid contact part
20 Circulation line
22 Cooler
24 Demister
26 Rich solvent line
26a Upstream portion
27 Valve
28 Rich solvent pump
30 Lean solvent line
32 Lean solvent pump
34 Heat exchanger
36 Gas-liquid contact part
38 Chimney tray
40 Washing section
42 Circulation line
44 Cooler
46 Demister
48 Top portion
50 Outer shell
52 Release part
54 Chimney tray
56 Re-boiler line
58 Regeneration reboiler
59 Steam line
60 Demister
62 Recovery line
64 Condenser
66 Absorption solvent tank
68 Tank introduction line
70 Overflow line
72 Shutoff valve (Valve)
74 Branch line
75 Valve
83 Bottom portion
84 Riser
86, 86A, 86B Cover
100 Controller

The invention claimed is:

1. A $CO_2$ recovery device, comprising a cooling absorption tower including:
   an outer shell;
   a cooling section for cooling a flue gas, the cooling section being disposed in the outer shell; and
   an absorbing section configured to cause $CO_2$ in the flue gas cooled by the cooling section to be absorbed in an absorption solvent, the absorbing section being disposed in the outer shell and above the cooling section,
   wherein the absorbing section includes a chimney tray for storing the absorption solvent which has absorbed $CO_2$ in the flue gas, the chimney tray being disposed at a lowest portion of the absorbing section,
   wherein the $CO_2$ recovery device further comprises:
   an absorption solvent tank disposed below the absorbing section; and
   a tank introduction line for introducing the absorption solvent stored in the chimney tray to the absorption solvent tank.

2. The $CO_2$ recovery device according to claim 1, wherein an inner diameter of the outer shell at the cooling section is larger than an inner diameter of the outer shell at the absorbing section.

3. The $CO_2$ recovery device according to claim 1, wherein the tank introduction line extends to the absorption solvent tank without passing through underground.

4. The $CO_2$ recovery device according to claim 1, wherein the tank introduction line includes an overflow line connected to the chimney tray within a height range of an upper half of a riser of the chimney tray.

5. The $CO_2$ recovery device according to claim 4, comprising:
   a valve disposed in the overflow line; and
   a blower for feeding a flue gas to the cooling absorption tower,
   wherein the valve is configured to be opened based on a signal indicating that the blower is stopped.

6. The $CO_2$ recovery device according to claim 1, comprising:
   a regeneration tower for regenerating the absorption solvent from the absorbing section;
   a regeneration tower introduction line for extracting the absorption solvent from the chimney tray and introducing the absorption solvent to the regeneration tower; and
   a branch line branching from the regeneration tower introduction line and connected to the absorption solvent tank,
   wherein the tank introduction line includes the branch line and a portion of the regeneration tower introduction line upstream of a branch position of the branch line.

7. The $CO_2$ recovery device according to claim 6, further comprising an absorption solvent pump for pumping the absorption solvent to the regeneration tower, the absorption solvent pump being disposed in a portion of the regeneration tower introduction line downstream of the branch position.

8. A $CO_2$ recovery method, comprising:
- a step of cooling a flue gas by a cooling section disposed in an outer shell;
- a step of feeding the flue gas cooled by the cooling section to an absorbing section disposed in the outer shell and above the cooling section;
- a step of causing $CO_2$ in the flue gas to be absorbed in an absorption solvent by the absorbing section;
- a step of storing the absorption solvent which has absorbed $CO_2$ in the flue gas by the absorbing section in a chimney tray disposed at a lowest portion of the absorbing section; and
- a step of introducing the absorption solvent stored in the chimney tray to an absorption solvent tank disposed below the absorbing section via a tank introduction line.

9. The $CO_2$ recovery method according to claim 8, comprising:
- a step of feeding a flue gas to the cooling section by using a blower,
- wherein the cooling step includes cooling the flue gas fed by the blower, and
- wherein the step of introducing to the absorption solvent tank includes, when the blower is stopped, opening a valve disposed in the tank introduction line to introduce the absorption solvent to the absorption solvent tank.

* * * * *